(12) United States Patent
Singh et al.

(10) Patent No.: US 9,364,974 B2
(45) Date of Patent: Jun. 14, 2016

(54) METHOD OF FORMING AN ARTICLE FROM NON-MELT PROCESSIBLE POLYMERS AND ARTICLES FORMED THEREBY

(75) Inventors: Rojendra Singh, Natick, MA (US); Vimal K. Pujari, Northboro, MA (US); Ilya L. Rushkin, Acton, MA (US)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 918 days.

(21) Appl. No.: 12/886,367

(22) Filed: Sep. 20, 2010

(65) Prior Publication Data
US 2011/0101574 A1    May 5, 2011

Related U.S. Application Data

(60) Provisional application No. 61/244,358, filed on Sep. 21, 2009.

(51) Int. Cl.
| | |
|---|---|
| *B29C 43/10* | (2006.01) |
| *B29C 43/00* | (2006.01) |
| *B29C 67/04* | (2006.01) |
| *B29C 43/56* | (2006.01) |
| *B29C 47/00* | (2006.01) |
| *B29C 47/54* | (2006.01) |
| *B29K 27/12* | (2006.01) |
| *B29K 27/18* | (2006.01) |
| *B29K 67/00* | (2006.01) |
| *B29K 71/00* | (2006.01) |
| *B29K 77/00* | (2006.01) |
| *B29K 79/00* | (2006.01) |

(52) U.S. Cl.
CPC ............... *B29C 43/10* (2013.01); *B29C 43/006* (2013.01); *B29C 67/04* (2013.01); *B29C 43/56* (2013.01); *B29C 47/0009* (2013.01); *B29C 47/54* (2013.01); *B29C 2043/562* (2013.01); *B29C 2043/566* (2013.01); *B29K 2027/12* (2013.01); *B29K 2027/18* (2013.01); *B29K 2067/00* (2013.01); *B29K 2071/00* (2013.01); *B29K 2077/10* (2013.01); *B29K 2079/00* (2013.01); *B29K 2079/08* (2013.01)

(58) Field of Classification Search
CPC .... B29C 43/00; B29C 43/003; B29C 43/006; B29C 43/02; B29C 43/10; B29C 43/58; B29C 2043/106; B29C 2043/5808
USPC ................... 264/126, 85, 109, 120, 125, 127
See application file for complete search history.

(56) References Cited

U.S. PATENT DOCUMENTS

| | | | | |
|---|---|---|---|---|
| 4,267,237 A | * | 5/1981 | Duperray et al. | 428/422 |
| 5,128,074 A | | 7/1992 | Steel et al. | |
| 5,429,782 A | * | 7/1995 | Masutani et al. | 264/127 |
| 5,590,388 A | * | 12/1996 | Kuwabara et al. | 419/39 |
| 5,688,453 A | | 11/1997 | England et al. | |
| 5,763,082 A | * | 6/1998 | Kokumai et al. | 428/402 |
| 5,830,396 A | | 11/1998 | Higgins et al. | |
| 5,993,716 A | | 11/1999 | Draenert | |
| 6,706,346 B2 | | 3/2004 | Tsumiyama | |
| 6,808,577 B2 | * | 10/2004 | Miyazaki et al. | 156/89.12 |
| 7,758,781 B2 | | 7/2010 | Schmeckpeper et al. | |
| 2002/0030299 A1 | | 3/2002 | Tsumiyama | |
| 2004/0157996 A1 | * | 8/2004 | Gallucci | 525/132 |
| 2008/0213611 A1 | | 9/2008 | Asgari | |
| 2009/0093608 A1 | * | 4/2009 | Rushkin et al. | 528/170 |

FOREIGN PATENT DOCUMENTS

| | | |
|---|---|---|
| CA | 890515 | 1/1972 |
| CN | 10902036 A | 1/2007 |
| EP | 0722920 B1 | 11/2001 |
| GB | 1516266 A | 4/1976 |
| JP | 63281809 | 11/1988 |
| JP | 6000887 A | 1/1994 |
| JP | 11117003 A | 4/1999 |
| JP | 2002103363 A | 4/2002 |
| JP | 2003002642 | 1/2003 |

OTHER PUBLICATIONS

Yuan et al. "Forming and control of pores by capsule-free hot isostaic pressing in NiTi shape memroy alloys", Smart Materials and Structures, 17, Feb. 11, 2008.*
International Search Report of PCT/US2010/049523 (1 pg.).

* cited by examiner

*Primary Examiner* — Christina Johnson
*Assistant Examiner* — Xue Liu
(74) *Attorney, Agent, or Firm* — Abel Law Group, LLP; Chi Suk Kim

(57) ABSTRACT

A method of preparing an article includes compressing a polymeric material to form a body and hot isostatic pressing (HIP) the body in an inert atmosphere at a pressure of at least 3 ksi without an encapsulant. The body may optionally be sintered prior to hot isostatic pressing (HIP). The body may have a porosity of not greater than 8% prior to hot isostatic pressing (HIP). The polymer material may be a non-melt processible polymer.

19 Claims, No Drawings

METHOD OF FORMING AN ARTICLE FROM NON-MELT PROCESSIBLE POLYMERS AND ARTICLES FORMED THEREBY

CROSS-REFERENCE TO RELATED APPLICATION(S)

The present application claims priority from U.S. Provisional Patent Application No. 61/244,358, filed Sep. 21, 2009, entitled "METHOD OF FORMING AN ARTICLE FROM NON-MELT PROCESSIBLE POLYMERS AND ARTICLES FORMED THEREBY," naming inventors Rojendra Singh, Vimal K. Pujari and Ilya L. Rushkin, which application is incorporated by reference herein in its entirety.

FIELD OF THE DISCLOSURE

This disclosure in general relates to methods of forming articles comprising non-melt processible polymers and articles comprising non-melt processible polymers.

BACKGROUND

Conventional melt processing techniques for forming articles of thermoplastic polymers cannot be utilized when using synthetic resins that lack melt viscosity or have a high melt viscosity. Instead, such non-melt processible polymers are typically cast into shaped articles through application of pressure to powders. Common techniques include direct forming, hot compression molding, and isostatic pressing. Isostatic pressing is used in highly demanding applications because it provides isotropic properties.

Conventional isostatic pressing techniques include encapsulating a polymeric material in an encapsulant followed by applying isostatic pressure on the encapsulated polymeric material. For example, in the case of cold isostatic pressing (CIP), a polymeric material may be placed in a rubber bag that is evacuated and subsequently subjected to isostatic external pressures. Conventional hot isostatic pressing (HIP) techniques include encapsulating a polymeric material in a metal can (Japanese patent no. JP63281809A) or include submersing in a low melt alloy (Canadian patent no. CA890515A) or glass followed by the applying isostatic pressure. In the case of a HIP process, the encapsulated polymeric material is also heated.

Such pressing techniques often produce waste, such as waste from encapsulants. In the case of submersion techniques, additional chemical handling and article cleaning produce both chemical waste and additional processing steps.

As such, an improved processing technique for non-melt processible polymers would be desirable.

DESCRIPTION OF THE PREFERRED EMBODIMENT(S)

In an exemplary embodiment, an isostatic pressing process includes pre-forming a green part followed by a hot isostatic pressing (HIP) process without an encapsulant. An encapsulant is defined as a barrier covering an article exposed to HIP. In an example, an article is formed as a green body utilizing a compression technique. For example, the green body can be compressed to a porosity of not greater than 8%. Porosity is defined as the percent difference between the calculated and theoretical density. A green part or body is defined as a part that has been cold-pressed. The green body is subjected to a HIP process, such as at a pressure of at least 3 ksia. The green body may be subjected to a sintering process at elevated temperature in an inert atmosphere prior to the HIP process. The resulting heat treated body may be cooled to form the article or may be further processed, such as by machining the body or by attaching the body to other components to form the article. In particular, the article has a desirable density and improved mechanical properties.

In an embodiment, the method may be performed utilizing polymeric materials, such as fluoropolymer, polyamide, polyaramid, polyimide, polyamideimide, polyester, polyether, polyetherketone, polyaryletherketone, polysulfone, polyethersulfone, polyphenylene oxide, polyphenylene sulfide, phenolic resin, diene elastomers, polybenzimidazoles, polybenzoxazole, polybenzoylenebenzimidazole, thermoplastic polyurethane, a styrenic copolymer, or any blend or combination thereof. In particular, the polymeric material includes a polyimide, a polyaramid, polybenzimidazoles, polybenzoxazole, polybenzoylenebenzimidazole, fluoropolymer, polyaryletherketone, a polyester or any combination thereof.

An exemplary polyamide includes nylon 6, nylon 6,6, nylon 11, nylon 12, or any combination thereof. An exemplary polyaryletherketone can include polyetherketone, polyetheretherketone, polyetheretherketoneketone, or any combination thereof. In a particular example, the polyaryletherketone can include polyetheretherketone (PEEK). An exemplary styrenic polymer includes a polymer having at least one block of polystyrene, such as polystyrene or acrylonitrile butadiene styrene copolymer (ABS), or any combination thereof. An exemplary phenolic resin includes a resole resin or a novolac resin.

An exemplary fluoropolymer includes fluorinated ethylene propylene (FEP), polytetrafluoroethylene (PTFE), polyvinylidene fluoride (PVDF), perfluoroalkoxy (PFA), a terpolymer of tetrafluoroethylene, hexafluoropropylene, and vinylidene fluoride (THV), polychlorotrifluoroethylene (PCTFE), ethylene tetrafluoroethylene copolymer (ETFE), ethylene chlorotrifluoroethylene copolymer (ECTFE), a terpolymer of ethylene, hexafluoropropylene, and tetrafluoroethylene, or any combination thereof.

In a further example, the polymer is a polyester, such as polyethylene terephthalate. In another example, the polyester is a liquid crystal polymer. An exemplary liquid crystal polymer includes aromatic polyester polymers, such as those available under tradenames XYDAR® (Amoco), VECTRA® (Hoechst Celanese), SUMIKOSUPER™ (Sumitomo Chemical), EKONOL™ (Saint-Gobain), DuPont HX™ or DuPont ZENITE™ (E.I. DuPont de Nemours), RODRUN™ (Unitika), GRANLAR™ (Grandmont), or any combination thereof.

In a particular example, the method may be performed utilizing polymeric materials, such as non-melt processible polymers. A non-melt processible polymer may have a melt flow index (MFI) value of not greater than 0.01 g/10min. MFI is defined as the weight of a polymer in grams flowing in 10 minutes through a capillary of specific diameter and length due to a pressure that is unique to a polymer being tested. The test is described in ASTM D1238. Alternatively, the non-melt processible polymer may not exhibit a melt viscosity. An exemplary non-melt processible polymer may include a polyimide, a polyaramid, polybenzimidazoles, polybenzoxazole, polybenzoylenebenzimidazole, fluoropolymer, polyaryletherketone, or any combination thereof. An exemplary fluoropolymer includes polytetrafluoroethylene.

In particular, the polymer may include polyimide. An exemplary polyimide includes a polyimide formed from imidization of the polyamic acid product of a diamine with a dianhydride. An exemplary diamine includes oxydianiline (ODA), 4,4'-diaminodiphenylpropane, 4,4'-diaminodiphenylmethane, 4,4'-diaminodiphenylamine, benzidine, 4,4'-diaminodiphenyl sulfide, 4,4'-diaminodiphenyl sulfone, 3,3'-diaminodiphenyl sulfone, 4,4'-diaminodiphenyl ether, bis-(4-aminophenyl)diethylsilane, bis-(4-aminophenyl)phenylphosphine oxide, bis-(4-aminophenyl)-N-methylamine, 1,5-diaminonaphthalene, 3,3'-dimethyl-4,4'-diaminobiphenyl, 3,3'-dimethoxybenzidine, 1,4-bis-(p-aminophenoxy)-benzene, 1,3-bis-(p-aminophenoxy)-benzene, m-phenylenediamine (MPD), p-phenylenediamine (PPD), or any mixture thereof. In a particular example, the diamine is oxydianiline (ODA), such as 3,4'-oxydianiline or 4,4'-oxydianiline. In particular, the ODA may be 4,4'-oxydianiline. In another example, the diamine is m-phenylenediamine (MPD), p-phenylenediamine (PPD), or any combination thereof An exemplary dianhydride includes pyromellitic dianhydride (PMDA), 2,3,6,7-naphthalenetetracarboxylic acid dianhydride, 3,3',4,4'-diphenyltetracarboxylic acid dianhydride, 1,2,5,6-naphthalenetetracarboxylic acid dianhydride, 2,2',3,3'-diphenyltetracarboxylic acid dianhydride, 2,2-bis-(3,4-dicarboxyphenyl)-propane dianhydride, bis-(3,4-dicarboxyphenyl)-sulfone dianhydride, bis-(3,4-dicarboxyphenyl)-ether dianhydride, 2,2-bis-(2,3-dicarboxyphenyl)-propane dianhydride, 1,1-bis-(2,3-dicarboxyphenyl)-ethane dianhydride, 1,1-bis-(3,4-dicarboxyphenyl)-ethane dianhydride, bis-(2,3-dicarboxyphenyl)-methane dianhydride, bis-(3,4-dicarboxyphenyl)-methane dianhydride, 3,4,3',4'-benzophenonetetracarboxylic acid dianhydride, or any mixture thereof. In a particular example, the dianhydride is pyromellitic dianhydride (PMDA). In another example, the dianhydride is benzophenonetetracarboxylic acid dianhydride (BTDA) or diphenyltetracarboxylic acid dianhydride (BPDA).

In a particular example, the polyimide is non-melt processible. For example, the polyimide may be formed from the polyamic acid product of reactants comprising PMDA and ODA.

In addition, the polymer material can include a filler dispersed in a matrix polymer. The matrix polymer forms a continuous phase in which the filler is dispersed. An exemplary filler can include an organic filler, such as a polymer filler, or an inorganic filler, such as a ceramic filler, a metal filler, or any combination thereof. The filler can be a solid lubricant, a ceramic or mineral filler, a polymer filler, a fiber filler, a metal particulate filler or salts or any combination thereof. An exemplary solid lubricant includes polytetrafluoroethylene, molybdenum disulfide, tungsten disulfide, graphite, graphene, expanded graphite, boron nitride, talc, calcium fluoride, cerium fluoride, or any combination thereof. An exemplary ceramic or mineral includes alumina, silica, titanium dioxide, calcium fluoride, boron nitride, mica, Wollastonite, silicon carbide, silicon nitride, zirconia, carbon black, pigments, or any combination thereof. An exemplary polymer filler includes polyimide, liquid crystal polymers such as Ekonol® polyester, polybenzimidazole, polytetrafluoroethylene, polyetheretherketone, any of the polymers listed above, or any combination thereof. An exemplary fiber includes nylon fibers, glass fibers, carbon fibers, polyacrylonitrile fibers, polyaramid fibers, polytetrafluoroethylene fibers, basalt fibers, graphite fibers, ceramic fibers, or any combination thereof. Exemplary metals include bronze, copper, stainless steel, or any combination thereof. An exemplary salt includes a sulfate, a sulfide, a phosphate, or any combination thereof.

Prior to processing, the polymeric material may be in the form of a powder. The powder may have an average particle size (primary particle) in a range of 1 micrometer to 500 micrometers. In addition, the polymeric material may have a desirable surface area, such as in a range of 5 $m^2/g$ to 200 $m^2/g$. For example, the surface area of the powder polymeric material may be at least 10 $m^2/g$, such as in a range of 30 $m^2/g$ to 120 $m^2/g$.

In an example, the polymeric material may be formed into a green body using a compressive technique. For example, the polymeric material may be pressure molded, such as cold compressed into a mold. In another example, the component may be cold isostatically pressed in the presence of an encapsulant. In a further example, the polymeric material may be RAM extruded, in which polymeric material is incrementally packed by reciprocating plunger to form the green body. In a further example, the polymeric material may be die pressed into a desired shape. Die pressing includes pressing a powder into a shaped die. In particular, such techniques are typically performed at temperatures below a melting point of the polymeric material. For example, the temperature may be less than 300° C., such as less than 100° C., less than 50° C., or even not greater than 30° C. or approximately room temperature.

In a particular example, the porosity of the green body can be not greater than 8% with respect to the theoretical value, such as not greater than 6.5%. For example, the porosity can be in a range of 3% to 8%, such as a range of 3.5% to 8%, a range of 3.5% to 6.5%, or even a range of 5% to 6.5%.

In one embodiment, the method includes sintering following formation into the green body but prior to HIP, the green body is subject to sintering to form a sintered body. Sintering consists of heating a sample under an inert atmosphere at or below the atmospheric pressure. In an example, sintering is performed in an inert atmosphere. For example, sintering may be performed in the presence of an inert gas, such as nitrogen or a noble gas. In particular, a noble gas may include helium or argon. In an example, sintering is performed at a temperature of at least 100° C. For example, the temperature of sintering may be in a range of 200° C. to 500° C., such as a range of 200° C. to 450° C. The sintering is performed at a pressure, such as a pressure in a range from 0 to 1.5 ksi or can be performed under vacuum. The sintering may be performed for a period of at least 1 hour. For example, sintering may be performed for a period of at least 2 hours, such as a period of at least 3 hours, or even at least 4 hours. In an example, sintering is performed for a period not greater than 48 hours, such as not greater than 24 hours.

A green or sintered body is subjected to HIP process. For example, a green or a sintered body may be further processed using HIP without an encapsulant. Hot isostatic pressing (HIP) includes heating an article in an environment having a pressure that is greater than atmospheric pressure, also referred to herein as isostatic heat treatment. In particular, the present HIP process provides an isostatic pressure directly to the body absent an intermediate encapsulant. The HIP process may be performed at a pressure of at least 3 ksi, such as at least 5 ksi. For example, the pressure may be at least 10 ksi, such as in a range of 10 ksi to 30 ksi. In addition, the HIP process may be performed at a temperature of at least 200° C. For example, the temperature may be in a range of 200° C. to 500° C., such as in a range of 200° C. to 450° C. In a particular example, the HIP process may be performed at a temperature greater than the sintering temperature. Alternatively, the HIP process may be performed at a temperature approximately the sintering temperature or at a temperature less than the sintering temperature.

In a particular embodiment, the sintered body is permitted to cool prior to the HIP process, referred to herein as the "Sinter-HIP" process. For example, the sintered body may be permitted to cool to a temperature less than 200° C., such as a temperature less than 150° C., a temperature less than 100° C., or even a temperature approximately room temperature prior to subsequent HIP process.

In an alternative embodiment, the sintered body is not permitted to substantially cool prior to the HIP process. For example, heat treating may be applied to the sintered body when the sintered body is at a temperature of at least 200° C., such as within 10° C. of the sintering temperature. In a particular embodiment, sintering and heat treating under isostatic pressure may be performed in the same vessel. In such an embodiment, the sintering temperature may be maintained and the pressure increased to perform the HIP process. In a further example, the green body may be sintered within a vessel and subsequently treated with one or more heat treatments within the same vessel at temperatures of at least 200° C. and pressures of at least 3 ksi. In a particular example, a green body may be sintered at a first temperature at approximately atmospheric pressure, subsequently heat treated at a second temperature of at least 200° C. and a second pressure of at least 3 ksi, followed by one or more subsequent heat treatments at a third temperature of at least 200° C. or a third pressure of at least 3 ksi. Alternatively, the green body may be subjected to the HIP process without sintering, referred to herein as the "SHIP" process.

Subsequently, the sintered and heat treated body may be cooled to room temperature. Cooling may be performed at a rate in a range of 5° C./min to 50° C./min, such as a rate in a range of 5° C./min to 30° C./min, or a range of 10° C./min to 25° C./min. Alternatively, the sintered and heat treated body may be quenched, such as dipping in a liquid coolant or subjected to a gas coolant.

Optionally, the resulting polymeric component can be treated to additional treatment, such as annealing. For example, heat treatment may be performed at elevated temperature, but not pressure, for extending periods. In particular, annealing is performed at a temperature less than the sintering temperature. In another example, annealing is performed at a temperature less than the hot isostatic pressing temperature. Annealing may reduce stress or evaporate moisture and volatile compounds from the polymeric component. The resulting body may be further processed such as machined, tooled, abraded, polished, or any combination thereof. Further, the body may be attached to other components to form an article.

In a particular method, a polymeric powder and optional filler can be die pressed to form a shaped green body. The shaped green body can be subjected to the SHIP process. For example, the shaped green body can be subjected to the SHIP process to form a net-shape part that does not utilize further machining to provide the articles contours.

The resulting polymeric component of the article may have desirable density and mechanical properties. For example, the porosity of the polymeric component of the article can be not greater than 4%, such as not greater than 2.5%, not greater than 1%, not greater than 0.8%, or even not greater than 0.5%. In particular, the polymeric component may exhibit a density change, defined as the percent increase in density relative to a sintered article formed of the same non-melt processible polymer at the same temperature, of at least 1%, such as at least 2.5%, or even at least 4%.

In an example, the polymer component has a desirable pore size after processing. In an example, the average pore size is not greater than 1.0 microns, such as not greater than 0.5 microns, or even 0.2 microns as measured using Hg porosimetry.

In an example, the polymer component can have a specific gravity of at least 1.4, such as at least 1.41, at least 1.42, or event at least 1.43. In addition, the polymer component can have a flexural strength of at least 140 MPa, such as at least 145 MPa, at least 150 MPa, or even at least 152 MPa. In particular, the polymer component may exhibit a flexural performance, defined as the percent increase in flexural strength relative to a sintered component formed utilizing the same green body forming conditions and sintering temperature, of at least 5%, such as at least 10%.

Embodiments of the above described methods provide desirable technical advantages. For example, embodiments of the above described methods reduce waste associated with encapsulants and improve product throughput and productivity as a result of reduced process steps. Embodiments provide articles with improved density and mechanical properties.

In an example, the above described method enables formation of net-shape articles having low porosity and free of tool marks. For example, green bodies can be die pressed and subjected to a SHIP process to form net-shape articles that do not utilize further machining. As such, at least a portion of the surface of the article is free of tool marks, such as a substantial portion of the surface. In particular, such methods can densify die shaped green bodies to have a specific gravity of at least 1.4, which is not achievable using die pressing alone.

In a particular example, the polymer of the polymer component includes polyimide. For example, the polyimide may be a product of ODA and PMDA. Further, the polyimide may have a surface area of at least 5 $m^2/g$, such as at least 10 $m^2/g$. In an example, the polyimide may be a direct formable polyimide, such as a polyimide selected from the Meldin 7000 series, available from Saint-Gobain Corporation.

In an example, the polyimide polymer component can have a specific gravity of at least 1.4, such as at least 1.41, at least 1.42, or event at least 1.43. In addition, the polymer component can have a flexural strength of at least 140 MPa, such as at least 145 MPa, at least 150 MPa, or even at least 152 MPa. In particular, the polymer component may exhibit a flexural performance, defined as the percent increase in flexural strength relative to a sintered component formed utilizing the same green body forming conditions and sintering temperature, of at least 5%, such as at least 10%.

EXAMPLES

Example 1

Meldin 7001 polyimide available from Saint-Gobain Corporation is subjected to cold (room temperature) isostatic pressing (CIP) to form green rods at 10 ksi, 15 ksi, 20 ksi, or 30 ksi. The green rods are subjected to the SHIP process to produce SHIP samples. The SHIP process is performed in a furnace, increasing the temperature to 400° C. and the pressure to 15 ksi simultaneously. The samples are held at 400° C. and 15 ksi for 1 hour. The furnace is subsequently depressurized and cooled to room temperature. The specific gravity values are illustrated in Table 1.

As illustrated, the porosity has a significant influence on the specific gravity. Further, densification of a green part with low porosity (7-8%) can be achieved by a SHIP process without using an encapsulant. However, exposing samples with porosity values greater than 8% to the SHIP process does not afford an increase in material density.

TABLE 1

Dependence of porosity on HIP processes

| Sample No. | CIP Pressure (ksi) | Green Porosity (%) | Post SHIP Specific Gravity |
|---|---|---|---|
| 1 | 10 | 20.4 | 1.12 |
| 2 | 15 | 13.7 | 1.31 |
| 3 | 20 | 6.5 | 1.41 |
| 4 | 30 | 4.8 | 1.42 |

Example 2

Two varieties of Meldin 7001 polyimide, available from Saint-Gobain Corporation, are cold pressed into pucks of 1.25 inches in diameter and 0.20 inches in thickness using a uniaxial press at 80 ksi. The polymer samples have identical composition and molecular weight, but have different specific surface area. Sample 1 and Sample 2 represent polyimide powder with specific surface area values of 60 $m^2/g$ and 90 $m^2/g$, respectively. A set of pucks are sintered in a $N_2$ atmosphere for 4 hours at 400° C. A set of green pucks and a set of sintered puck are subjected to a HIP process in presence of Argon gas at 15 ksi and 400° C. for 2 hours without an encapsulant to produce SHIP and Sinter-HIP samples. The densities of the materials before the HIP process are compared with densities after the HIP process, as illustrated in Table 2.

TABLE 2

Specific Gravity of Polyimide Samples

| Samples | Porosity (%) | | Specific Gravity | | Flexural Strength (MPa) | |
|---|---|---|---|---|---|---|
| | Green | Sintered | Sinter-HIP | SHIP | Sinter-HIP | SHIP |
| 1 | 3.5 | 4.5 | 1.40 | 1.43 | 134.3 | 151.4 |
| 2 | 4.0 | 5.9 | 1.38 | 1.42 | 128.3 | 151.5 |

The polyimide samples (pucks) are machined into dimensions of 2×2.66×27 mm and subjected to a 3-point bend test to calculate the flexural strength, approximating ASTM D790. The results are tabulated in Table 2. As illustrated, the SHIP samples exhibit higher values for specific gravity and flexural strength in comparison to sintered and sinter-HIP samples. The flexural strength values are greater than those values reported for other isostatically molded PMDA/ODA polyimides, such as Meldin 7001 (Saint-Gobain Corp.) or Vespel SP-1 (DuPont), which is reported to be about 105 MPa to 110 MPa (Meldin 7000 series product catalogue and Vespel Design Handbook).

The densification of non-melt processable polymers using the encapsulant free HIP process is unexpected given that varieties of non-melt processable polymers can exhibit a decrease in density during sintering. In particular, a hot isostatic pressing process is performed in a gaseous environment, absent an intermediate material (encapsulant) between the gaseous environment and the article or component. In contrast, prior art utilizes encapsulants.

Further, it has been found that the encapsulant free HIP process is particularly effective when the green body has a porosity of 8% or less. When the green body has a porosity significantly greater than 8%, little densification is observed. However, when the green body has a porosity of 8% or less, the HIP process can achieve porosities of 0.7% or lower, such as 0.5% or lower.

In a first embodiment, a method of preparing an article includes compressing a polymeric material to form a body having a porosity of less than 8% and hot isostatic pressing (HIP) the body in an inert atmosphere at a pressure of at least 3 ksi free of an encapsulant. The body may be sintered in an inert atmosphere prior to hot isostatic pressing (HIP).

In an example of the first embodiment, compressing includes die pressing. In a further example of the first embodiment, the hot isostatic pressing (HIP) is performed on the body in a hot state resulting from sintering. In another example, the sintering and the hot isostatic pressing (HIP) are performed in the same vessel. The sintering can be performed at a temperature of at least 200° C., such as at a temperature in a range of 200° C. to 500° C., or a range of 200° C. to 450° C. In an example, the sintering is performed for a period of at least 1 hour, such as at least 2 hours.

In another example of the first embodiment, the polymeric material comprises a non-melt processable polymer, such as a non-melt processable polymer is selected from the group consisting of a polyimide, a polyaramid, polybenzimidazoles, polybenzoxazole, polybenzoylenebenzimidazole, fluoropolymer, polyaryletherketone, polyester, or any combination thereof. In an example, the non-melt processable polymer comprises polyimide, such as a polyimide derived from ODA and PMDA. In a further example, the non-melt processable polymer comprises a fluoropolymer, such as polytetrafluoroethylene. The non-melt processable polymer can have a melt flow index value of not greater than 0.01.

In a further example, the polymeric material has an average particle size in a range of 1 micrometer to 100 micrometers. The polymeric material can have a surface area in a range of 5 $m^2/g$ to 200 $m^2/g$, such as a range of 30 $m^2/g$ to 120 $m^2/g$. In another example, after hot isostatic pressing, the polymeric material has an average pore size of not greater than 1.0 microns.

In an additional example, the inert atmosphere includes an inert gas selected from the group consisting of nitrogen, a noble gas, or any combination thereof. The noble gas can be helium or argon.

In a particular example, the hot isostatic pressing (HIP) is performed at a temperature of at least 200° C., such as a range of 200° C. to 500° C., or even a range of 200° C. to 450° C. The pressure can be at least 5 ksi, such as at least 10 ksi, or in a range of 10 ksi to 30 ksi. The hot isostatic pressing (HIP) can be performed for a period of at least 30 minutes, such as at least 1 hour. The method can further include annealing at a temperature lower than a temperature of hot isostatic pressing. The method can further include cooling the body, the body having a density change relative to a sintered article formed of the same non-melt processable polymer of at least 1%, such as at least 2.5%, or even at least 4%.

In a second embodiment, a method of forming a polymeric article includes compressing a non-melt processable polymeric material to form a green body, sintering the green body in an inert atmosphere to form a sintered body, and hot isostatic pressing (HIP) the sintered body in an inert atmosphere at a pressure of at least 3 ksi free of encapsulant. The hot isostatic pressing (HIP) is performed on the sintered body without substantially cooling the sintered body after sintering.

In an example of the second embodiment the pressure is at least 5 ksi. The sintering can be performed at a temperature of at least 200° C. The hot isostatic pressing (HIP) can be performed at a temperature of at least 200° C. In another example, the non-melt processable polymer has a surface area in a range of 5 $m^2/g$ to 200 $m^2/g$.

In a third embodiment, a method of forming a polymer article includes compressing a non-melt processable polymeric material to form a green body, sintering the green body in an inert atmosphere at a sintering temperature of at least 200° C. within a vessel to form a sintered body, and hot isostatic pressing (HIP) the sintered body in an inert atmosphere at a pressure of at least 3 ksi and a heat treatment temperature of at least 200° C. within the vessel.

In an example of the third embodiment, the pressure is at least 5 ksi. The non-melt processable polymeric material can have a surface area in a range of 5 $m^2/g$ to 200 $m^2/g$.

In a fourth embodiment, an article includes a non-melt processable polymer. The article has a specific gravity of at least 1.4 and a flexural performance of at least 5%.

In an example of the fourth embodiment, the flexural performance is at least 10%. The non-melt processable polymer can have a melt flow index value of not greater than 0.01. In a further example, the non-melt processable polymer is selected from the group a polyimide, a polyaramid, polybenzimidazoles, polybenzoxazole, polybenzoylenebenzimidazole, fluoropolymer, polyaryletherketone, polyester, or any combination thereof In another example of the fourth embodiment, the article has a density change relative to a sintered article formed of the same non-melt processable polymer of at least 1%, such as at least 2.5%, or even at least 4%.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A method of preparing an article, the method comprising:
   compressing a polymeric material to form a body having a porosity of less than 8%; and
   hot isostatic pressing (HIP) the body in an inert atmosphere at a pressure of at least 3 ksi free of an encapsulant,
   wherein the article comprises a polymeric article.

2. The method of claim 1, wherein compressing includes die pressing.

3. The method of claim 1, wherein the body is sintered in an inert atmosphere prior to hot isostatic pressing (HIP).

4. The method of claim 3, wherein the hot isostatic pressing (HIP) is performed on the body in a hot state resulting from sintering.

5. The method of claim 3, wherein the sintering and the hot isostatic pressing (HIP) are performed in the same vessel.

6. The method of claim 3, wherein the sintering is performed at a temperature of at least 200° C.

7. The method of claim 1, wherein the polymeric material comprises a non-melt processable polymer.

8. The method of claim 7, wherein the non-melt processable polymer is selected from the group consisting of a polyimide, a polyaramid, a polybenzimidazoles, a polybenzoxazole, a polybenzoylenebenzimidazole, a fluoropolymer, apolyaryletherketone, a polyester, and any combination thereof.

9. The method of claim 8, wherein the non-melt processible polymer comprises polyimide.

10. The method of claim 7, wherein non-melt processable polymer has a melt flow index value of not greater than 0.01 g/10 min.

11. The method of claim 1, wherein the polymeric particulate material has an average particle size in a range of 1 micrometer to 100 micrometers.

12. The method of claim 1, wherein the polymeric material has a surface area in a range of 5 $m^2/g$ to 200 $m^2/g$.

13. The method of claim 1, wherein, after hot isostatic pressing, the polymeric particulate material has an average pore size of not greater than 1.0 microns.

14. The method of claim 1, wherein the inert atmosphere includes an inert gas selected from the group consisting of nitrogen, a noble gas, and any combination thereof.

15. The method of claim 1, wherein the hot isostatic pressing (HIP) is performed at a temperature of at least 200° C.

16. The method of claim 1, wherein the pressure is at least 5 ksi.

17. The method of claim 1, further comprising annealing at a temperature lower than a temperature of hot isostatic pressing.

18. The method of claim 7, further comprising cooling the body, the body having a density change relative to a sintered article formed of the same non-melt processable polymer of at least 1%.

19. The method of claim 1, wherein the solid particulate material is a powder.

* * * * *